Jan. 26, 1965 P. N. WRIGHT 3,167,711

TRANSCEIVER HAVING MEANS FOR NEUTRALIZING INHERENT DISTRIBUTED CAPACITY

Filed June 3, 1964 2 Sheets-Sheet 1

INVENTOR
PAUL N. WRIGHT

BY Hood, Gust & Irish

ATTORNEYS

INVENTOR
PAUL N. WRIGHT
BY Wood, Gust & Irish
ATTORNEYS

United States Patent Office 3,167,711
Patented Jan. 26, 1965

3,167,711

TRANSCEIVER HAVING MEANS FOR NEUTRALIZING INHERENT DISTRIBUTED CAPACITY

Paul N. Wright, Wabash, Ind.

Filed June 3, 1964, Ser. No. 372,241
10 Claims. (Cl. 325—18)

The present invention relates to an amplifier circuit and more particularly to a linear amplifier which can be used in combination with a transceiver or the equivalent for increasing the power thereof in both the transmitting and receiving positions.

Conventional transceivers include circuitry which functions during both receiving and transmitting, a mechanical switch normally being used for the purpose of altering the circuit configuration so it can function selectively as a receiver or transmitter. Such switches have been found to introduce instabilities due to the capacities in the mechanical configuration thereof. Therefore, compensations have had to be designed into the usual circuitry in order to overcome the instability problem and to offset the troublesome inherent capacities.

Transceivers of the handie-talkie variety are normally of low power. In a great many instances, it is desirable to increase the power of the transmitter portion of the transceiver and also to increase the receiving range thereof. With respect to the transmitter portion, it obviously is necessary to increase the power delivered to the antenna. In the receiver portion, it obviously is necessary to increase the amplification of received signals. The present invention comprehends the provision of a single circuit which is capable of adding to the transmitter power and the receiver range in a simple, reliable and economical manner.

It is therefore an object of this invention to provide amplifier circuitry whereby transmitter power and receiver range may both be increased.

It is another object of this invention to provide a linear amplifier circuit which may be used as the final stage of the transmitter and as the first stage of a receiver for increasing transmitting and receiving power.

It is yet another object of this invention to provide a power amplifier for increasing the range of transmitting and receiving wherein a mechanical switch is used for altering the configuration of the amplifier circuit between transmitting and receiving conditions.

It is still another object of this invention to provide a linear amplifier of the character mentioned hereinabove wherein the inherent distributed capacity in the mechanical switch is used for the purpose of neutralizing the amplifier circuitry, thereby overcoming one of the problems encountered in earlier circuits of the mechanical switch introducing instabilities.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
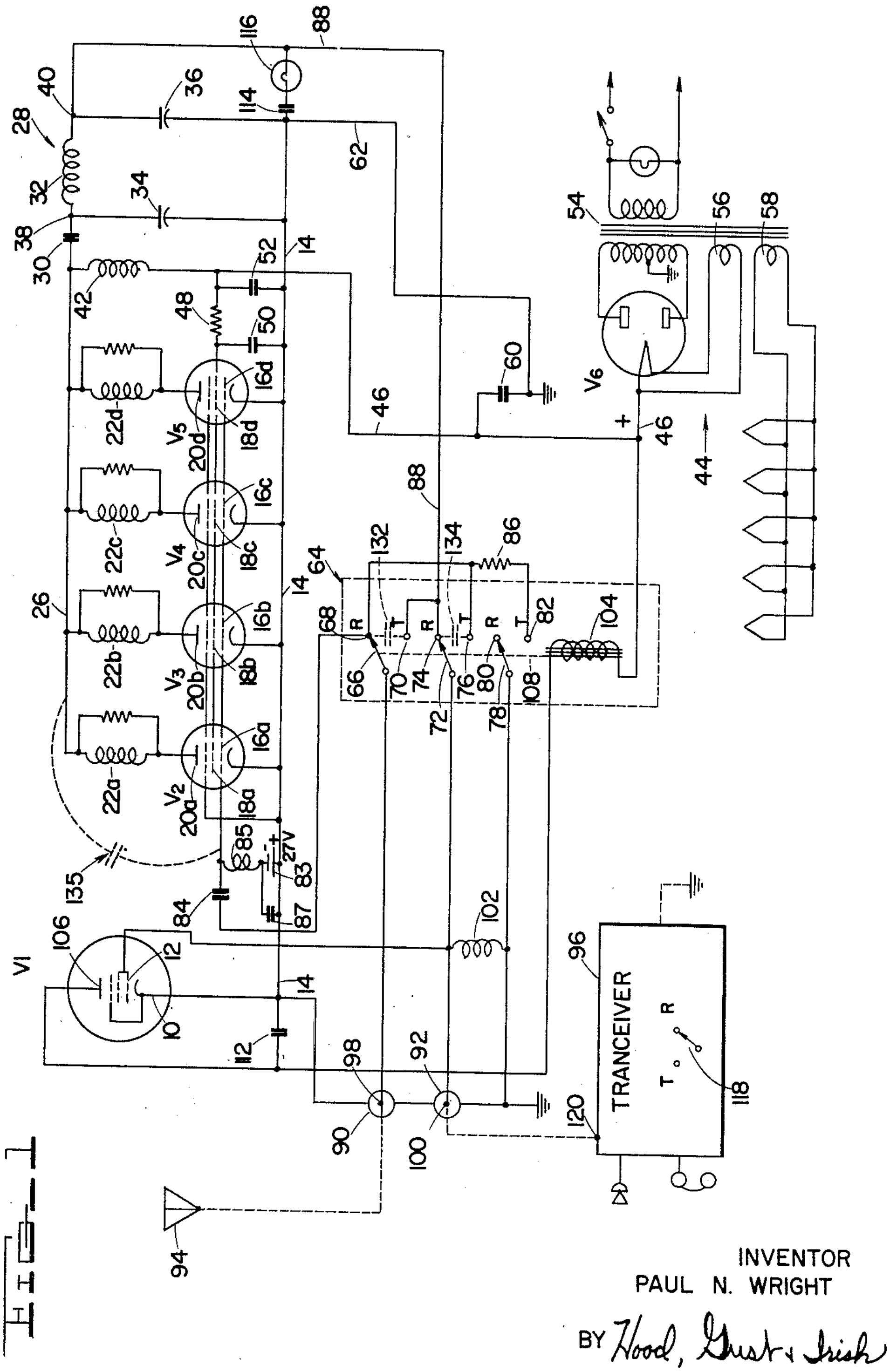
FIG. 1 is a circuit diagram of one embodiment of this invention.

Referring to the drawings, and more particularly to FIG. 1, the circuit in the practical, working form shown includes a first vacuum tube V1 and four other vacuum tubes V2, V3, V4 and V5. A power tube V6 in the form of a full-wave rectifier is also used. The tube V1 is a conventional pentode having the suppressor connected to the cathode 10 and the screen connected to the control grid 12. This pentode is therefore connected as a triode, and as will be obvious to persons skilled in the art, a triode may be used instead of this particular pentode so long as the operating principles as will be explained later are followed.

For the tubes V2 through V5, all of the cathodes are connected together by means of a cathode bus 14, all of the control grids **16*a*, 16*b*, 16*c* and 16*d* are connected together, the screen grids 18*a* through 18*d* are connected together as are the suppressor grids 20*a* through 20*d***. These tubes V2 through V5 are also pentodes connected into the circuit as tetrodes.

Conventional parasitic suppressors **22*a* through 22*d* are series-connected to the anodes 24*a* through 24*d***, respectively, of the tubes as shown. These parasitic suppressors, in the working embodiment of the invention shown, are conventional 100-ohm, 1-watt resistors wound with four turns of No. 22 copper wire. Equivalent suppressor circuits may be used in accordance with conventional practice without departing from the spirit and scope of this invention.

The upper ends of the suppressor circuits are connected together by means of a common anode supply line 26 which leads to a conventional pi-network coupling indicated generally by the numeral 28. A capacitor 30 is used for the purpose of coupling the anode line 26 and the anodes of the tubes V2 through V5 to the pi-network coupling 28, as shown. This coupling 28 includes an inductor 32 and two variable capacitors 34 and 36 connected between the opposite ends of the inductor 32 and the cathode line 14. The coupling 28 may be regarded as having an input connection at the point 38 and an output connection at the point 40.

Supply voltage is fed to the line 26 by means of an ordinary radio frequency choke 42 which is series-connected between the supply line 26 and a power supply indicated generally by the numeral 44. This power supply 44 will be described in more detail hereinafter. Supply voltage is taken from the line 46 for the screen grids **18*a* through 18*d* by means of a screen-dropping resistor 48. Two by-pass capacitors 50 and 52 connect from the opposite ends of the resistor 48 to the cathode line 14** as shown.

The power supply 44 includes the full-wave rectifier tube V6 and a suitable, high voltage transformer 54 having a secondary, high voltage winding which is center-tapped and grounded as shown. This transformer 54 includes the usual filament supply windings 56 and 58 in the secondary thereof for heating the filament of the tube V6 and also the various filaments of the tubes V1 through V5. The positive supply line 46 connects to the filament of the tube V6 as shown and also to one side of a filter capacitor 60 which is grounded. A line 62 grounds the cathode line 14.

A biasing battery 83 has its positive terminal connected to the cathode line 14 and the negative terminal connected to one end of radio frequency choke 85. The other end of this choke 85 is connected to the control grid **16*a* as shown. A by-pass capacitor 87 is connected in shunt across the battery 83**.

Figure 2:
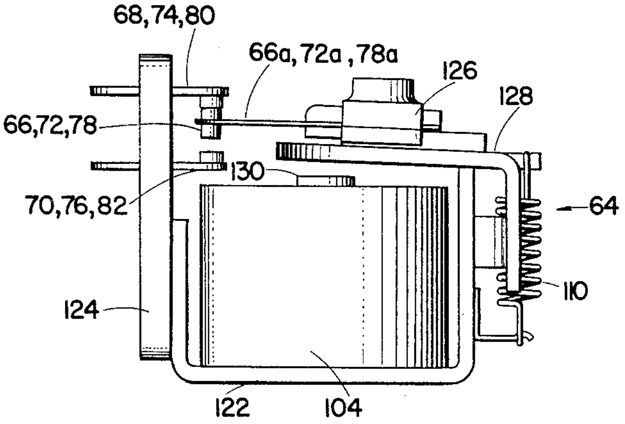
FIG. 2 is a side view of the relay switch used in the circuit of FIG. 1.
Figure 3:
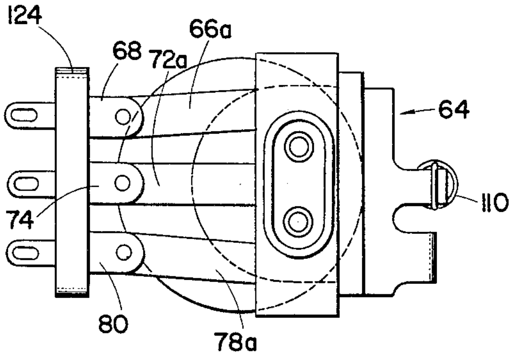
FIG. 3 is a top view of the switch of FIG. 2.

The cathode 10 of the tube V1 is also connected to the cathode line 14. The remaining connections to the tube V1 will be described hereinafter following the description of the switching relay which is generally indicated by the numeral 64 and enclosed in the dashed line box in FIG. 1. This same switching relay 64 is also illustrated in FIGS. 2 and 3.

This particular relay 64 is of the triple-pole, double-throw type having three switches or switching sections, each switching section including an armature and two stator contacts. The first switching section includes armature 66 and two stator contacts 68 and 70. This armature contact 66 is normally in engagement with the contact 68. The second switching section includes the armature 72 and two stator contacts 74 and 76. This armature 72 is normally in engagement with the contact 74. The third switching section includes the armature contact 78 and the two stator contacts 80 and 82, the armature contact 78 being normally in engagement with the stator contact 80. As will be explained more fully hereinafter, the armature contacts 66, 72 and 78 are shown in the "receive" position. By moving these armature contacts downwardly into engagement with the respective contacts 70, 76 and 82, the circuitry will be changed to the "transmit" position.

The control grids 16*a* through 16*d* are coupled by means of a capacitor 84 to the stator contact 68. This stator contact 68 in turn is connected to another stator contact 76. The latter in turn is connected to still another stator contact 82 by means of a series-connected resistor 86. The two contacts 70 and 74 are connected together and also to a line 88 which leads to the output connection 40 of the pi-network 28.

Two conventional coaxial connectors, indicated by the numerals 90 and 92, respectively, are provided which are used for connecting the amplifier circuitry to an antenna 94 as shown and also to a conventional transceiver 96 as shown. These connections will be explained in more detail hereinafter. The center pin 98 of the connector 90 connects to the armature contact 66. The center pin 100 of the connector 92 connects to the armature contact 72. The armature contact 78 is connected to ground as shown as are the outer shield portions of the connectors 90 and 92 as shown. The control grid 12 of the tube V1 connects directly to the armature contact 72 and to the center pin 100 of the connector 92. A radio frequency choke 102 is connected between ground and this center pin 100.

The relay coil 104 of the relay 64 is series-connected between the anode 106 of the tube V1 and the power supply line 46 as shown. This relay coil 104 is operatively connected to the armature contacts 66, 72 and 78 in the usual way, this connection being indicated by the dashed line 108. When the relay coil 104 is energized, all of the armature contacts 66, 72 and 78 will be shifted into engagement with the respective contacts 70, 76 and 82. When the coil 104 is de-energized, a spring 110 (FIGS. 2 and 3) returns the armature contacts to the positions shown in FIG. 1.

A by-pass capacitor 112 connects between the anode 106 and ground. Another capacitor 114 is series-connected to a conventional neon bulb or pilot lamp 116, these two components being series-connected between the line 88 and ground.

The transceiver 96 may be of conventional design, and in the working embodiment of the invention shown in FIG. 1 it delivers power of approximately 1-watt when operated as a transmitter. It contains the usual "transmit" and "receive" switch, indicated generally by the reference numeral 118, this switch being thrown to the "transmit" position for operating the unit as a transmitter and to the "receive" position to operate the same as a receiver. The terminal 120 on the transceiver is that which is normally connected to the usual antenna. In the illustrated instance, however, it is shown as being connected to the pin 100 of the coaxial connector 92. It is desirable to have the ground circuit of the transceiver also connected to the ground circuit represented by the cathode line 14. A conventional coaxial transmission line may be used for connecting the antenna terminal 120 of the transceiver to the coaxial connector 92.

The usual antenna 94 is connected by means of a conventional coaxial transmission line or the like to the connector 90.

Before explaining the operation of the circuitry thus far described, the relay switch 64 shown in further detail in FIGS. 2 and 3 will be described. This relay is of conventional design, the coil 104 having approximately 5,000-ohms resistance. Like numerals will indicate like parts. The coil 104 is mounted on the usual steel frame 122. A wafer 124 of plastic or insulating material is secured to the frame 122 and carries the stator contacts 68, 70, 74, 76, 80 and 82 as shown. The armature contacts 66, 72 and 78 are carried by the usual, conductive spring arms 66*a*, 72*a* and 78*a*, respectively, these arms being secured to a suitable insulator 126 which provides terminals for individual circuit connections. This insulator 126 is mounted on the steel relay armature 128 which is pivoted on the frame 122 for movement into and out of engagement with the core 130 of the coil 104. The spring 110 is tensioned between the armature 128 and the frame 122 as shown and normally swings the armature 128 to its clockwise position in which the contacts 66, 72 and 78 are engaged with the stators 68, 74 and 80, all as shown in FIG. 1. When the coil 104 is energized, the armature 128 is drawn downwardly into contact with the core 130, which moves the contacts 68, 72 and 74 into engagement with the respective stators 70, 76 and 82. As will be obvious to a person skilled in the art, the construction of this relay is conventional.

At this point, note should be taken of the fact that there is inherent, distributed capacity between the two stator contacts 68 and 70 as well as between the two stator contacts 74 and 76. These contacts as shown in FIGS. 2 and 3 are relatively large flat pieces of metal which are spaced apart and substantially parallel. These pieces, therefore, generally speaking, serve as the plates of a simple capacitor. Affecting the capacity between these two plates is the presence of the respective armature contact. The dashed line capacitor 132 indicates the distributed capacity across the two contacts 68 and 70. Similarly, the capacitor 134 shown in dashed lines indicates the distributed capacity between the two contacts 74 and 76. The significance of these distributed capacities will be explained more fully in the description which later follows.

In operation, the circuitry as shown in FIG. 1 is set to operate in the position to receive radio signals. The tube V1 operates as a high mu triode with zero bias on the grid. It therefore draws little or no plate current. During the time the circuitry is operated in the "receive" position, the tube V1 may be regarded as being nonconductive. A radio frequency signal picked up by the antenna 94 is fed via the connector 98 to the contacts 68 of the relay 64 and from there to the control grid 16*a* through 16*d* of the tubes V2 through V5. The circuit parameters and the biasing voltage supplied by the battery 83 are selected such as to operate these tubes V2 through V5 as Class A amplifiers, such that the signal fed to the control grids 16*a* through 16*d* are amplified and fed to the pi-network 28. From this network 28, the amplified signals are coupled via the line 88 to the stator contact 74, and from there to the connector pin 100. These same amplified signals are connected to the antenna terminal 120 of the transceiver 96, the transceiver thereupon utilizing these signals in the usual way. Normally, the signals received by the antenna 94 are voice-modulated such that the transceiver reproduces these modulated signals as audible signals.

The tubes V2 through V5 operate as linear amplifiers and supply to the transceiver an amplified signal. These tubes therefore serve as a pre-amplifier for the transceiver.

While four tubes V2 through V5 have been shown, as will appear to persons skilled in the art, a single tetrode or even a triode tube may be used as a substitute therefor without departing from the spirit and scope of this invention.

When it is desired to transmit, the switch 118 is thrown to the "transmit" position and the amplitude modulated carrier from the transceiver and supplied to the antenna terminal 120 is fed to the pin 100 and from there to the control grid 12 of the tube V1. This causes the tube V1 to become conductive. The increase in anode 106 current passing through the relay coil 104 thereupon actuates the relay 64, shifting all the armature contacts 66, 72 and 78 into engagement with the respective contacts 70, 76 and 82. This same amplitude modulated signal emitted by the transceiver is now conducted via the armature contact 72 through the contact 76 to the control grids 16*a* through 16*d* of the tubes V2 through V5. These tubes amplify the signal and feed the same to the pi-network 28 from which they are coupled via the line 88 to the contact 70, armature 66 and pin 98 to the antenna 94. Thus, the tubes V2 through V5 serve to amplify the signal emitted by the transceiver. The circuit components and biasing voltages are so selected as to operate these tubes V2 through V5 as Class AB2 amplifiers during the "transmit" condition.

The amplifier V2 through V5 is operated in the linear range in both the "receiving" and "transmitting" positions such that while power amplification is attained, no distortion is introduced.

Stability of the amplifier in both the "receiving" and "transmitting" positions is insured by neutralizing the grid-to-plate capacities in the tubes V2 through V5 by means of the distributed capacitors 132 and 134. These two capacitors 132 and 134 are indicated by still another capacitor 135 shown in dashed lines as being connected between the anode and grid circuits of the tubes V2 through V5. This capacitor 135 serves to neutralize the tubes and prevents them from breaking into oscillation in a manner which is well understood by a person skilled in the art.

By tracing the circuitry, it will be found that the particular capacitor 132 is connected between the control grid and plate circuits of the tubes V2 through V5 when the relay 64 is in its "receive" position. Also by tracing the circuitry, it will be found that the capacitor 134 is similarly connected to the tubes V2 through V5 when the relay 64 is thrown to the "transmit" position. Thus, the capacitor 132 neutralizes the amplifier during operation as a receiver and the capacitor 134 during operation as a transmitter.

As will now be seen, instead of the relay 64 introducing instability into the total circuitry which necessitates some kind of compensation in the way of additional circuitry, components or the like, the inherent distributed capacity in the relay 64 is put to use in a manner whereby it stabilizes amplifier operation. Thus, it is not necessary to add extra components for neutralizing the amplifier, since the inherent, distributed capacity in the relay 64 is used for this purpose. Thus, instead of the capacitances in the relay 64 being harmful, they are put to efficient and reliable use.

By connecting the relay 64 into the circuitry as now disclosed, the same circuitry may be used for both receiving and transmitting. In order to accomplish this, there needs to be a 180° phase shift between the input and output portions of the amplifier circuitry, and as will be apparent to those skilled in the art, such a phase shift is obtained by reason of the fact that no tuned network is used in the grid circuit of the amplifier. This grid circuit is resistive in character, being composed essentially of the battery 83, the choke 85 and the by-pass capacitor 87.

The purpose of the resistor 86 is to serve as a terminating resistor for the antenna output circuit 120 of the transceiver and also as a matching input resistance or impedance for the input circuit of the amplifier V2 through V5.

In a practical operating embodiment of this invention, the following listed components are used. However, it is to be understood that this list is given by way of example only and is not to be regarded as limitative of the invention. Other values of a component may be used without departing from the spirit and scope of this invention.

| | |
|---|---|
| Tube V1 | 6AQ5. |
| Tubes V2 through V5 | 6GK6. |
| Tube V6 | 5U4GB. |
| Capacitors 50, 52, 84, 87 | .01 mfd. |
| Capacitor 30 | .0033 mfd. |
| Capacitor 34 | 3 to 50 mmfd. |
| Capacitor 36 | 40 to 350 mmfd. |
| Capacitor 114 | 18 mmfd. |
| Capacitor 60 | 40 mfd. |
| Suppressors 22*a*, 22*b*, 22*c* and 22*d* | 100 ohm, 1-watt resistors wound with four turns of No. 22 copper wire. |
| Resistor 48 | 100 ohm, ½-watt. |
| Resistor 86 | 100 ohm, 1-watt. |
| Choke 85 | 1,000-ohm, 1-watt resistor wound with a full single layer of No. 34 enameled copper wire. |
| Choke 42 | 40 microh. |
| Inductor 32 | 10 microh. |
| Choke 102 | 22 microh. |
| Transformer 54 | 117 volts, 60-cycle primary, secondary 815 volts center-tapped, secondary 56, five volts at 3-amps., secondary 58, 6.3 volts at 4-amps. |
| Battery 83 | 27 volts. |
| Lamp 116 | Lamp .15 amp., 6.3 volts. |

While there have been described above the principles of this invention in connection with specific apparatus, it is to be clearly understood that this description is made only by way of example and not as a limitation to the scope of the invention.

What is claimed is:

1. For use in the transmitting or receiving of radio signals, an amplifier comprising a first pentode tube having plate, suppressor, screen, control grid and cathode electrodes, said suppressor electrode being connected to said cathode electrode, said screen and control grids being connected together, four pentode tubes each having plate, suppressor, screen, control grid and cathode electrodes, the last-mentioned suppressor electrodes being connected together, the last-mentioned screen electrodes being connected together, the last-mentioned control electrodes being connected together, the last-mentioned cathode electrodes being connected together, four parasitic suppressor networks, there being one each series connected to one each of the last-mentioned plate electrodes; a pi-network coupling circuit including an inductor coupled at one end to and in series with all of said parasitic networks, and two capacitors connected to the opposite ends, respectively, of said inductor and to said last-mentioned cathode electrodes; a source of supply voltage having positive and negative terminals, said positive terminal being connected in series with all of said parasitic networks for supplying said last-mentioned plate electrodes with voltage, said negative terminal being connected to said last-mentioned cathode electrodes; a voltage-dropping resistor series connected between the last-mentioned screen electrodes and said positive terminal, a by-pass capacitor connected between said last-mentioned screen electrodes and said last-mentioned cathode electrodes, said last-mentioned suppressor electrodes being connected to said last-mentioned cathodes, a series connected radio frequency choke and by-pass capacitor connected between said last-mentioned control electrodes and said last-mentioned cathode electrodes, a source of unidirectional biasing voltage connected in shunt with the last-mentioned by-pass capacitor, the positive side of said biasing source being next to said cathode electrodes, said last-mentioned capacitor being between said last-mentioned cathode electrodes and said choke, said biasing source being of a value to operate said four tubes as an amplifier in the Class A and Class AB2 range; the cathode electrode of said first tube being connected to said last-mentioned cathode electrodes; a triple-pole double-throw relay switch having first, second and third single-pole double-throw switches, each of said three switches having two stator controls and an armature contact, said relay switch also having an actuating coil operatively connected to said first, second and third armature contacts to move the latter in unison from engagement with respective first ones of said stator contacts to respective second ones of said stator contacts, spring means biasing said armature contacts into engagement with said first ones of said stator contacts, said relay coil when energized moving said armature contacts out of engagement with said first ones of said stator contacts and into engagement with the second ones of said stator contacts, one of the first switch stator contacts being capacitively coupled to said last-mentioned control electrodes, one of the second switch stator contacts being connected to the other end of said inductor, the other of the first switch stator contacts being connected to said one of said second stator contacts, one of the third switch stator contacts having no circuit connection thereto, the other of the last-mentioned stator contacts having a resistor series connected thereto and to the other of said second switch stator contacts; an antenna terminal, the armature contact of said first switch being connected to said antenna terminal, an equipment terminal, the armature contact of said second switch being connected to said equipment terminal, the control electrode of said first tube being connected to said equipment terminal, a radio frequency choke connected between said equipment terminal and the cathode electrode of said first tube, the armature contact of said third switch being connected to the cathode electrodes of said tubes, said relay coil being series-connected between the plate electrode of said first tube and the positive terminal of said source of supply voltage, said stator contacts of said first switch having capacity therebetween of a value for neutralizing the plate to grid capacity of said four tubes when the latter are used for receiving radio signals, said stator contacts of said second switch having capacity therebetween of a value for neutralizing the plate to grid capacity of said four tubes when the latter are used for transmitting radio signals, said three armature contacts being engaged with the respective said one stator contacts during the time when no radio frequency signal is applied to the control electrode of said first tube, said relay coil when energized shifting said three armature contacts into engagement with the respective said other stator contacts during the time when the conductivity of said first tube is increased by application of a radio frequency signal to the control electrode of the latter, the last-mentioned resistor being of a value whereby said four tubes operate as a Class AB2 amplifier during engagement of said armature contacts with the respective other of said stator contacts.

2. The amplifier of claim 1 and including in combination therewith a transceiver having transmitting and receiving antenna terminal means, and means for coupling said antenna terminal means to said equipment terminal.

3. For use in the transmitting or receiving of radio signals, an amplifier comprising a first pentode tube having plate, suppressor, screen, control grid and cathode electrodes, said suppressor electrode being connected to said cathode electrode, said screen and control grids being connected together, four pentode tubes each having plate suppressor, screen, control grid and cathode electrodes, the last-mentioned suppressor electrodes being connected together, the last-mentioned screen electrodes being connected together, the last-mentioned control electrodes being connected together, the last-mentioned cathode electrodes being connected together; a pi-network coupling circuit including an inductor coupled at one end to the plates of said four tubes, and two capacitors connected to the opposite ends, respectively, of said inductor and to said last-mentioned cathode electrodes; a source of supply voltage having positive and negative terminals, said positive terminal being connected to the plates of said four tubes, said negative terminal being connected to said last-mentioned cathode electrodes; a voltage-dropping resistor series connected between the last-mentioned screen electrodes and said positive terminals, a by-pass capacitor connected between said last-mentioned screen electrodes and said last-mentioned cathode electrodes, said last-mentioned suppressor electrodes being connected to said last-mentioned cathodes, a series connected radio frequency choke and by-pass capacitor connected between said last-mentioned control electrodes and said last-mentioned cathode electrodes, a source of unidirectional biasing voltage connected in shunt with the last-mentioned by-pass capacitor, the positive side of said biasing source being next to said cathode electrodes, said last-mentioned capacitor being between said last-mentioned cathode electrodes and said choke, said biasing source being of a value to operate said four tubes as an amplifier in the Class A and Class AB2 range; the cathode electrode of said first tube being connected to said last-mentioned cathode electrodes; a triple-pole double-throw relay switch having first, second and third single-pole double-throw switches, each of said three switches having two stator contacts and an armature contact, said relay switch also having an actuating coil operatively connected to said first, second and third armature contacts to move the latter in unison from engagement with respective first ones of said stator contacts to respective second ones of said stator contacts, spring means biasing said armature contacts into engagement with said first ones of said stator contacts, said relay coil when energized moving said armature contacts out of engagement with said first ones of said stator contacts and into engagement with the second ones of said stator contacts, one of the first switch stator contacts being capacitively coupled to said last-mentioned control electrodes, one of the second switch stator contacts being connected to the other end of said inductor, the other of the first switch stator contacts being connected to said one of said second stator contacts, one of the third switch stator contacts having no circuit connection thereto, the other of the last-mentioned stator contacts having a resistor series connected thereto and to the other of said second switch stator contacts; an antenna terminal, the armature contact of said first switch being connected to said antenna terminal, an equipment terminal, the armature contact of said second switch being connected to said equipment terminal, the control electrode of said first tube being connected to said equipment terminal, a radio frequency choke connected between said equipment terminal and the cathode electrode of said first tube, the armature contact of said third switch being connected to the cathode electrodes of said tubes, said relay coil being series connected between the plate electrode of said first tube and the positive terminal of said source of supply voltage, said stator contacts of said first switch having capacity therebetween of a value for neutralizing the plate to grid capacity of said four tubes when the latter are used for receiving radio signals, said stator contacts of said second switch having capacity therebetween of a value for neutralizing the plate to grid capacity of said four tubes when the latter are used for transmitting radio signals, said three armature contacts being engaged with the respective said one stator contacts during the time when no radio frequency signal is applied to the control electrode of said first tube, said relay coil when energized shifting said three armature contacts into engagement with the respective said other stator contacts during the time when the conductivity of said first tube is increased by application of a radio frequency signal to the control electrode of the latter, the last-mentioned resistor being of a value whereby said four tubes operate as a Class AB2 amplifier during engagement of said armature contacts with the respective others of said stator contacts.

4. For use in the transmitting or receiving of radio signals, a circuit comprising a first tube having plate, control grid and cathode electrodes, a second tube having plate, control grid and cathode electrodes, a pi-network coupling having input and output connections, said input connection being coupled to the platse of said second tube, a source of supply voltage having positive and negative terminals, said positive terminal being connected to the plate electrode of said second tube, said negative terminal being connected to the cathode electrodes of both tubes, a non-resonant biasing network coupled between the control and cathode electrodes of said second tube, said biasing network including a radio frequency choke and capacitor connected in series, said choke being connected to the control electrode of said second tube, a source of unidirectional biasing voltage connected in shunt to said capacitor with the positive side thereof being next to the cathode electrode of said second tube, the value of said biasing voltage being such as to operate said second tube in the range of from Class A to Class AB2, the cathode electrodes of said first and second tubes being connected together, a triple-pole double-throw relay switch having first, second and third single-pole double-throw switches, each of said three switches having two stator contacts and an armature contact, said relay switch also having an actuating coil operatively connected to said first, second and third armature contacts to move the latter in unison from engagement with respective ones of said stator contacts to the respective other stator contacts, spring means biasing said armature contacts into engagement with said respective ones of said stator contacts, one of the first switch stator contacts being coupled to the control electrode of said second tube, one of the second switch stator contacts being connected to the output connection of said pi-network coupling, the other of the first switch stator contacts being connected to said one of said second stator contacts, one of the third switch stator contacts having no circuit connection thereto, the other of the last-mentioned stator contacts having a resistor series connected thereto and to the other of said second switch stator contacts; an antenna terminal, the armature contact of said first switch being connected to said antenna terminal, an equipment terminal, the armature contact of said second switch being connected to said equipment terminal, the control electrode of said first tube being connected to said equipment terminal, a radio frequency choke connected between said equipment terminal and the cathode electrode of said first tube, the armature contact of said third switch being connected to the cathode electrodes of said tubes, said relay coil being series connected between the plate electrode of said first tube and positive terminal of said source of supply voltage, said stator contacts of said first switch having capacity therebetween of a value for neutralizing the plate to grid capacity of said second tube when the latter is used for receiving radio signals, said stator contacts of said second switch having capacity therebetween of a value for neutralizing the plate to grid capacity of said second tube when the latter is used for transmitting radio signals, said three armature contacts being engaged with the respective said one stator contacts during the time when no radio frequency signal is applied to the control electrode of said first tube, said relay coil when energized shifting said three armature contacts into engagement with the respective said other stator contacts during the time when the conductivity of said first tube is increased by application of a radio frequency signal to the control electrode of the latter.

5. For use in the transmitting or receiving of radio signals, a circuit comprising a first tube having plate, control grid and cathode electrodes, a second tube having plate, control grid and cathode electrodes, a pi-network coupling having input and output connections, said input connection being coupled to the plate of said second tube, a source of supply voltage having positive and negative terminals, said positive terminal being connected to the plate electrode of said second tube, said negative terminal being connected to the cathode electrodes of both tubes, a non-resonant biasing network coupled between the control and cathode electrodes for said second tube, said biasing network including means for biasing said second tube, the cathode electrodes of said first and second tubes being connected together, a triple-pole double-throw relay switch having first, second and third single-pole double-throw switches, each of said three switches having two stator contacts and an armature contact, said relay switch also having an actuating coil operatively connected to said first, second and third armature contacts to move the latter in unison from engagement with respective ones of said stator contacts to the other stator contacts, spring means biasing said armature contacts into engagement with said respective ones of said stator contacts, said relay coil when energized moving said armature contacts out of engagement with said respective ones of said stator contacts and into engagement with the other of said stator contacts, one of the first switch stator contacts being coupled to the control electrode of said second tube, one of the second switch stator contacts being connected to the output connection of said pi-network coupling, the other of the first switch stator contacts being connected to said one of said second stator contacts, one of the third switch stator contacts having no circuit connection thereto, the other of the last-mentioned stator contacts having a resistor series connected thereto and to the other of said second switch stator contacts; an antenna terminal, the armature contact of said first switch being connected to said antenna terminal, an equipment terminal, the armature contact of said second switch being connected to said equipment terminal, the control electrode of said first tube being connected to said equipment terminal, a radio frequency choke connected between said equipment terminal and the cathode electrode of said first tube, the armature contact of said third switch being connected to the cathode electrodes of said tubes, said relay coil being series connected between the plate electrode of said first tube and the positive terminal of said source of supply voltage, said stator contacts of said first switch having capacity therebetween of a value for neutralizing the plate to grid capacity of said second tube when the latter is used for receiving radio signals, said stator contacts of said second switch having capacity therebetween of a value for neutralizing the plate to grid capacity of said second tube when the latter is used for transmitting radio signals, said three armature contacts being engaged with the respective said one stator contacts during the time when no radio frequency signal is applied to the control electrode of said first tube, said relay coil when energized shifting said three armature contacts into engagement with the respective said other stator contacts during the time when the conductivity of said first tube is increased by application of a radio frequency signal to the control electrode of the latter.

6. For use in the transmitting or receiving of radio signals, a circuit comprising a first tube having plate, control grid and cathode electrodes, a second tube having plate, control grid and cathode electrodes, a pi-network coupling having input and output connections, said input connection being coupled to the plate of said second tube, a source of supply voltage having positive and negative terminals, said positive terminal being connected to the plate electrode of said second tube, said negative terminal being connected to the cathode electrodes of both tubes, means for biasing the control electrode of said second tube, the cathode electrodes of said first and second tubes being connected together, an antenna terminal, relay switch means including first means for alternatively selectively connecting said antenna terminal to the control electrode of said second tube and to the output connection of said pi-network coupling, an equipment terminal, said relay switch means including second means for alternatively selectively connecting said equipment terminal to said output connection when said antenna terminal is connected to said second tube control electrode and to said second tube control electrode when said antenna terminal is connected to said output connection, said relay switch means including a relay coil series connected between said first tube plate electrode and said positive terminal of said source of supply voltage, said first tube being normally non-conductive, said relay switch means further including means for operating said first and second means in response to energizing said relay coil, said relay coil being energizable in response to said first tube becoming conductive, means coupling said first tube control electrode to said equipment terminal, said first means including capacitor means for neutralizing the plate to grid capacity of said second tube when the latter is used for receiving radio signals, said second means including capacitor means for neutralizing the plate to grid capacity of said second tube when the latter is used for transmitting radio signals.

7. For use in the transmitting or receiving of radio signals, a circuit comprising a first tube having plate, control grid and cathode electrodes, a second tube having plate, control grid and cathode electrodes, an impedance-matching coupling having input and output connections, said input connection being coupled to the plate of said second tube, a source of supply voltage having positive and negative terminals, said positive terminal being connected to the plate electrode of said second tube, said negative terminal being connected to the cathode electrodes of both tubes, means for biasing the control electrode of said second tube, the cathode electrodes of said first and second tubes being connected together, an antenna terminal, relay switch means including first means for alternatively selectively connecting said antenna terminal to the control electrode of said second tube and to the output connection of said coupling, an equipment terminal, said relay switch means including second means for alternatively selectively connecting said equipment terminal to said output connection when said antenna terminal is connected to said second tube control electrode and to said second tube control electrode when said antenna terminal is connected to said output connection, said relay switch means including a relay coil series connected between said first tube plate electrode and said positive terminal of said source of supply voltage, said first tube being normally nonconductive, said relay switch means further including means for operating said first and second means in response to energizing said relay coil, said relay coil being energizable in response to said first tube becoming conductive, means coupling said first tube control electrode to said equipment terminal, said first means including capacitor means for neutralizing the plate to grid capacity of said second tube when the latter is used for receiving radio signals, said second means including capacitor means for neutralizing the plate to grid capacity of said second tube when the latter is used for transmitting radio signals.

8. For use in transmitting or receiving radio signals, a circuit comprising an amplifier having input and output circuits, said amplifier including anode and control electrodes having inter-electrode capacity therebetween, an antenna circuit, an equipment-connecting circuit, first switch means for alternatively selectively coupling said antenna circuit to said input and output circuits, second switch means for alternatively selectively coupling said equipment-connecting circuit to said input circuit when said antenna circuit is coupled to said output circuit and to said output circuit when said antenna circuit is coupled to said input circuit, said first and second switch means including inherent capacitor means for neutralizing said inter-electrode capacity.

9. For use in the transmitting or receiving of radio signals, a circuit comprising a first tube having plate, control grid and cathode electrodes, a second tube having plate, control grid and cathode electrodes, an impedance-matching coupling having input and output connections, said input connection being coupled to the plate of said second tube, means for supplying energizing potential to said electrodes, an antenna terminal, relay switch means including first means for alternatively selectively connecting said antenna terminal to the control electrode of said second tube and to the output connection of said coupling, an equipment terminal, said relay switch means including second means for alternatively selectively connecting said equipment terminal to said output connection when said antenna terminal is connected to said second tube control electrode and to said second tube control electrode when said antenna terminal is connected to said output connection, said relay switch means further including means for operating said first and second means in response to energization of said relay switch means, means for energizing said relay switch means in response to a change in conductivity of said first tube, means coupling said first tube control electrode to said equipment terminal, said first means including capacitor means for neutralizing the plate to grid capacity of said second tube when the latter is used for receiving radio signals, said second means including capacitor means for neutralizing the plate to grid capacity of said second tube when the latter is used for transmitting radio signals.

10. For use in the transmitting or receiving of radio signals, a radio frequency amplifier having input and output circuits, said amplifier having a control electrode and an output electrode, said electrodes having interelectrode capacity therebetween, said control electrode being coupled into said input circuit, said output electrode being coupled into said output circuit, an antenna circuit, an equipment-connecting circuit, first switch means for alternatively selectively coupling said antenna circuit to said input and output circuits, second switch means for alternatively selectively coupling said equipment-connecting circuit to said input circuit when said antenna circuit is coupled to said output circuit and to said output circuit when said antenna circuit is coupled to said input circuit, said first and second switch means including inherent capacitor means for neutralizing said interelectrode capacity.

References Cited by the Examiner

UNITED STATES PATENTS

| | | | |
|---|---|---|---|
| 2,491,244 | 12/49 | Becker | 325—18 |
| 2,841,655 | 7/58 | Horowitz | 330—76 |
| 2,866,089 | 12/58 | Maass | 325—18 |
| 2,936,367 | 5/60 | Kobetich et al. | 325—18 |

DAVID G. REDINBAUGH, *Primary Examiner.*